(12) United States Patent
Keith et al.

(10) Patent No.: US 9,995,457 B1
(45) Date of Patent: Jun. 12, 2018

(54) MULTICOLOR ILLUMINATION FOR A SINGLE PANEL DISPLAY SOURCE

(71) Applicants: Christopher A. Keith, Wilsonville, OR (US); Eric P. Stratton, Portland, OR (US)

(72) Inventors: Christopher A. Keith, Wilsonville, OR (US); Eric P. Stratton, Portland, OR (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 181 days.

(21) Appl. No.: 14/860,389

(22) Filed: Sep. 21, 2015

(51) Int. Cl.
| | |
|---|---|
| *F21V 7/04* | (2006.01) |
| *H05B 37/02* | (2006.01) |
| *F21V 9/08* | (2018.01) |
| *F21V 8/00* | (2006.01) |
| *F21V 9/16* | (2006.01) |
| *F21V 9/06* | (2018.01) |
| *F21V 13/02* | (2006.01) |
| *F21Y 101/02* | (2006.01) |

(52) U.S. Cl.
CPC .................. *F21V 9/08* (2013.01); *F21V 9/06* (2013.01); *F21V 9/16* (2013.01); *F21V 13/02* (2013.01); *G02B 6/0008* (2013.01); *F21Y 2101/02* (2013.01)

(58) Field of Classification Search
CPC ... G02B 6/0088; G02B 6/0028; G02B 6/0065
See application file for complete search history.

(56) References Cited

U.S. PATENT DOCUMENTS

2011/0227487 A1* 9/2011 Nichol ................. G02B 6/0018
315/158

* cited by examiner

*Primary Examiner* — Joseph L Williams
(74) *Attorney, Agent, or Firm* — Donna P. Suchy; Daniel M. Barbieri

(57) ABSTRACT

A display system for providing multicolor light patches for illuminating display images includes at least one light source for providing a light, at least one light pipe having an input end and an output end for allowing the light to enter via the input end and exit via the output end, and at least one color interface coupled to the output end of the at least one light pipe. The at least one color interface includes at least one color material and each color material has a different color characteristic. Light passing through the color material creates an illumination patch associated with the color characteristic of the color material. The display system further includes an optical device coupled with the at least one color interface and configured to receive the illumination patches, combine the illumination patches, and cause a combined illumination patch to be projected as a display image.

20 Claims, 2 Drawing Sheets

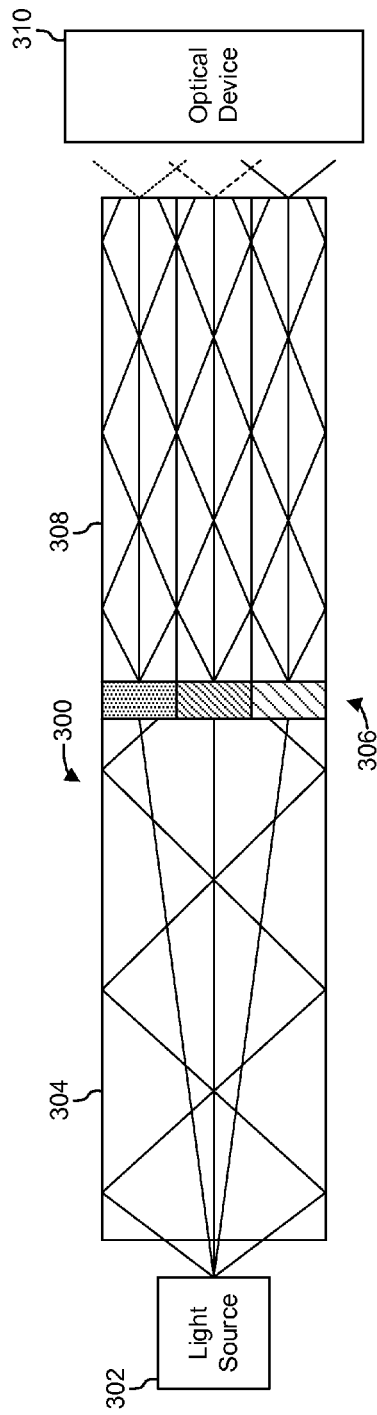
FIG. 4
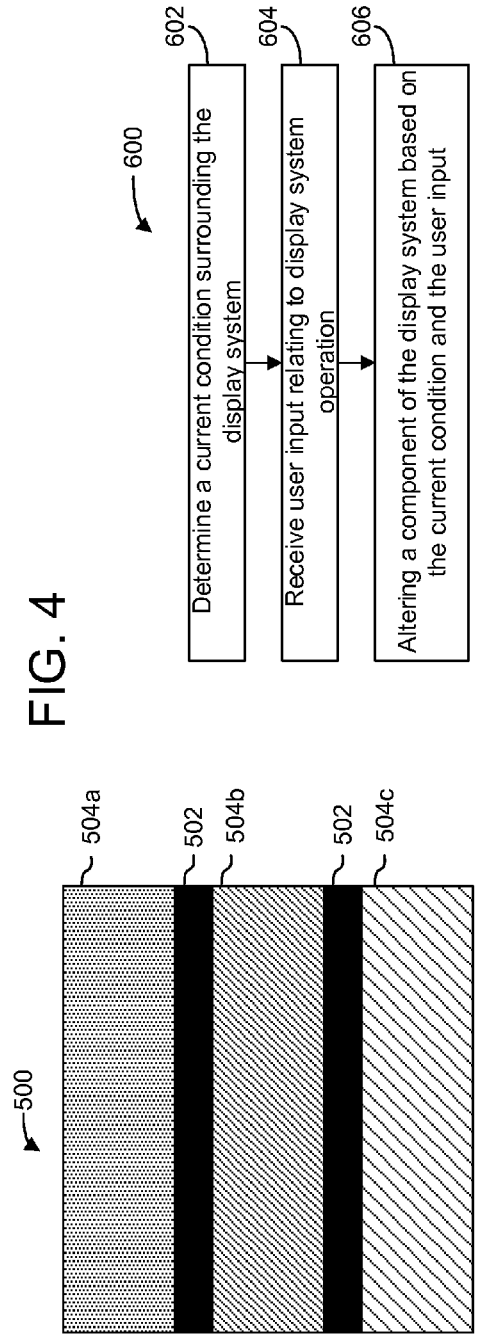
FIG. 5
FIG. 6

MULTICOLOR ILLUMINATION FOR A SINGLE PANEL DISPLAY SOURCE

BACKGROUND

The inventive concepts disclosed herein relate to display systems. More particularly, the inventive concepts disclosed herein relate to multicolor illumination systems for projection systems.

Typical multicolor illumination systems require separate optical channels for each color (e.g., three separate optical channels are required for a three-color illumination system). In some projection systems, multiple small input displays are projected as a single larger display image. Some multicolor illumination systems have only a single display source that is illuminated by different colors using a color wheel, LED pulses, or lasers, which sequentially illuminate the display with different colors. In such configurations, the image to be projected is divided into three (or more/less) images of different component colors, and then each image is projected for one-third of a frame so that each of the component colors combine to form a complete image over the course of one frame. However, projecting each color separately reduces the maximum brightness of the display by a factor of the number of separate colors projected.

What is needed are systems and methods for projecting a multicolored image with an illumination source that can simultaneously project multiple colors.

SUMMARY

In one aspect, embodiments of the inventive concepts disclosed herein are directed to a display system for providing multicolor light patches for illuminating display images. The display system includes at least one light source configured to provide a light, at least one light pipe having an input end and an output end and being configured to allow the light to enter via the input end and exit via the output end, and at least one color interface coupled to the output end of the at least one light pipe. The at least one color interface includes at least one color material and each color material has a different color characteristic. Light passing through the color material creates an illumination patch associated with the color characteristic of the color material. The display system further includes an optical device coupled with the at least one color interface and configured to receive the illumination patches, combine the illumination patches, and cause a combined illumination patch to be projected as a display image.

In a further aspect, embodiments of the inventive concepts disclosed herein are directed to a display system for providing multicolor light patches for illuminating display images. The display system includes a plurality of light sources configured to provide a light and a plurality of light pipes having an input end and an output end. Each light pipe corresponds to one of the light sources and is configured to receive light from the corresponding light source. The display system further includes at least one color interface coupled to the input end of each light pipe. The at least one color interface includes a plurality of color materials each having a different color characteristic and corresponding to one of the light pipes, and light passing through the color materials and corresponding light pipe creates a plurality of illumination patches. Each illumination patch is associated with one of the color characteristics of the color materials. The display system further includes an optical device coupled with at least one light pipe of the plurality of light pipes and configured to receive the illumination patches, combine the illumination patches, and cause a combined illumination patch to be projected as a display image.

In another aspect, embodiments of the inventive concepts disclosed herein are directed to a display system for providing multicolor light patches for illuminating display images. The display system includes a light source configured to provide a light, a first light pipe and a second light pipe. Each light pipe has an input end and an output end and is configured to allow the light to enter via the input end and exit via the output end. The display system further includes at least one color interface coupled to the output end of the first light pipe and the input end of the second light pipe. The at least one color interface includes a plurality of color materials each having a different color characteristic, and light passing through the first light pipe, the color materials, and the second light pipe creates a plurality of illumination patches. Each illumination patch is associated with one of the color characteristics associated with the color materials. The display system further includes an optical device coupled with at least one light pipe of the plurality of light pipes and configured to receive the illumination patches, combine the illumination patches, and cause a combined illumination patch to be projected as a display image.

BRIEF DESCRIPTION OF THE DRAWINGS

The disclosure will become more fully understood from the following detailed description, taken in conjunction with the accompanying figures, wherein like reference numerals refer to like elements, in which:

FIG. 4 is a schematic illustration of a multicolor illumination system having a single light source and multiple light pipes, according to an exemplary embodiment;

FIG. 5 is a schematic illustration of a color interface having dead bands, according to an exemplary embodiment; and FIG. 6 is a flow diagram of a method for controlling colors of the multicolor illumination system, according to an exemplary embodiment.

DETAILED DESCRIPTION

Before turning to the figures, which illustrate exemplary embodiments of the inventive concepts disclosed herein in detail, it should be understood that the inventive concepts disclosed herein are not limited to the details or methodology set forth in the description or illustrated in the figures. It should also be understood that the terminology is for the purpose of description only and should not be regarded as limiting.

The systems and methods of the inventive concepts disclosed herein may be utilized in a number of display and/or illumination systems. For example, in some embodiments, the systems and methods of the inventive concepts disclosed herein may be used in display systems for theaters, consumer display devices for home use, portable display devices, as well as display systems for any type of vehicle or aircraft (e.g., consumer automobile, military, and/or commercial heads up display (HUD) devices). According to various exemplary embodiments of the inventive concepts disclosed herein, the systems and methods of the inventive concepts disclosed herein may be used by any type of illumination system to project a multicolored image using an illumination source that can simultaneously project multiple colors.

Referring generally to the figures, systems and methods for simultaneously projecting multiple colors are shown and described. A multicolor illumination system for providing multicolor illumination may generally include a light source (e.g., a white light emitting diode (LED), an ultraviolet (UV) LED, a color LED, a laser), one or more light pipes (e.g., light tunnels, light rods, or other objects for transferring and/or reflecting light), and one or more color materials configured to receive and absorb light from the one or more light pipes and emit one or more illumination patches of light of particular colors. In various embodiments, the color material may be one of color filters, quantum dots, and/or color phosphors. In some embodiments, the type of color material is based on a characteristic of the light source and/or the type of display system used. The multicolor illumination system may further include an optical device configured to combine the illumination patches and project the illumination patches as a display image.

Figure 1:
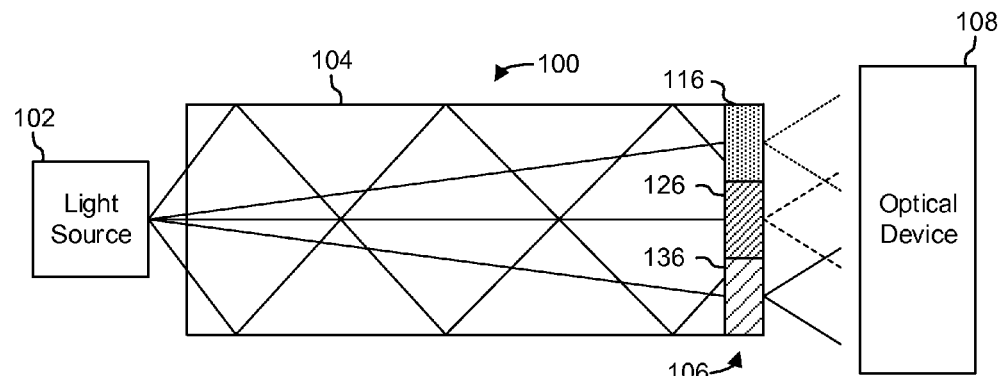
FIG. 1 is a schematic illustration of a multicolor illumination system having a single light source, according to an exemplary embodiment.

Referring now to FIG. 1, a schematic illustration of a multicolor illumination system 100 having a single light source 102 is shown according to an exemplary embodiment. The multicolor illumination system 100 includes a light source 102, a light pipe 104, a color interface 106, and an optical device 108. As shown, the multicolor illumination system 100 includes a single light source 102, but may include multiple light sources in some embodiments. The light source 102 may be any type of light source, such as a white LED, a color LED, a UV LED, a combination of LED types (e.g., multiple color LEDs), a coherent light source (e.g., a laser), or any other type of light source. The light source 102 is configured to emit a light into the light pipe 104. Light emitted from the light source 102 passes through the light pipe 104 and is received by the color interface 106. The light pipe 104 may be any type of object for transferring and/or reflecting light, such as a hollow four-sided object having reflective internal walls (e.g., mirrored walls) or a solid light rod. The light pipe 104 may be any type of pipe or tunnel configured to transfer light from an input end to an output end. In some embodiments, the light pipe 104 is configured to transfer light from the input end to the output end using reflective surfaces that may be configured to reflect light via total internal reflection. The light pipe 104 may include, for example, an array of mirrors fastened together to form the light pipe 104. The mirrors may be stacked close to one another or arranged in another way to reflect flight from the light source 102 to the color interface 106. For example, in some embodiments, a single continuous mirror may be used for the entire inner surface of the light pipe 104 or a separate continuous mirror may be used for each side of the inner surface of the light pipe 104. In some embodiments, the mirrors may be spaced apart so that they are positioned only at or near to where light rays from the light source 102 will reflect. Light emitted from the light source 102 may reflect and pass through the light pipe 104 at any angle without impacting the color of the output image of the multicolor illumination system 100.

In some embodiments, the color interface 106 may be located at an end of the light pipe 104 though the color interface 106 may also be located at other locations with respect to the light pipe 104 (e.g., an input interface of the light pipe 104, in the middle of the light pipe 104). In some embodiments, multiple color interfaces 106 may be used with a single light pipe 104. In some embodiments, the color interface 106 may be a plurality of color interfaces. In some embodiments, each of the plurality of color interfaces is configured to emit a certain color of light. In some embodiments, the color of light emitted by a particular color interface of the plurality of color interfaces is different from the color of light emitted from other color interfaces. As shown in FIG. 1, light from the light source 102 traverses the light pipe 104 before being received by the color interface 106. The color interface 106 absorbs certain colors of light from the received light and emits an illumination patch of light having a color that does not include the absorbed light (e.g., the color interface 106 receives light, alters the wavelength of the received light, and emits the light having the altered wavelength). The illumination patch of light may be of a certain color based on a characteristic of a material of the color interface 106 (e.g., the characteristic may be based on the color(s) that the color interface 106 absorbs). The color interface 106 may be of any width, length, or height. In some embodiments, the width of the color interface 106 may be configured to adjust the aspect ratio of the image to be displayed.

Characteristics of the color interface 106 may vary based on the type of the light source 102. In one embodiment, the light source 102 includes one or more white LEDs and the color interface 106 may be or include a plurality of color filters configured to absorb a color of light. For example, when light passes through an individual color filter, the color filter absorbs a certain color of light and emits an illumination patch of light having a particular color that no longer includes the absorbed color of light. The optical device 108 is configured to receive the illumination patch, combine the illumination patch with other illumination patches received from other color filters, and project the combined illumination patch as a display image. For example, the color interface 106 may include a red filter 116, a green filter 126, and a blue filter 136 and the light source 102 may be a white LED light that emits a white light. Upon receiving the white light, the red filter 116 is configured to absorb green and blue light from the white light (e.g., the red filter 116 alters the wavelength of the light) and emit an illumination patch of light having a red color. The green filter 126 is configured to absorb red and blue light from the white light and emit an illumination patch of light having a green color. The blue filter 136 is configured to absorb green and red light from the white light and emit an illumination patch of light having a blue color. The color interface 106 may include filters having different color properties than the red filter 116, blue filter 126, and green filter 136. For example, a cyan filter may be configured to absorb only red light and emit a cyan illumination patch. While FIG. 1 illustrates an embodiment of the color interface 106 having three color filters each corresponding to a single color, the color interface 106 may include any number of color filters corresponding to any number of colors in some embodiments. The optical device 108 may combine different colored illumination patches received from the interface 106 for display (e.g., to be projected on a display screen).

In some embodiments, the light source 102 may include one or more UV LEDs. In such an embodiment, the color interface 106 may include a plurality of quantum dots. The quantum dots may be structured to absorb the light from the UV LED and to emit a specific color of light based on the wavelength of the absorbed light, thereby emitting illumination patches having different colors. The optical device 108 may be configured to combine the illumination patches before projecting the combined illumination patches for display. In some embodiments, the light source 102 is a laser, and the quantum dots absorb light from the laser and output illumination patches having different colors in a similar manner.

In some embodiments, the light source 102 includes one or more color LEDs. In such embodiments, the color interface 106 may include a plurality of color phosphors. Each color phosphor may be configured to absorb light from the color LED and emit illumination patches having different colors based on a property of each color phosphor. The optical device 108 may be configured to combine the illumination patches before projecting the combined illumination patches for display.

The optical device 108 may be or include any object for reimaging, filtering, redirecting, and/or combining the illumination patches emitted by the color interface 106. For example, the optical device 108 may be or may include a plurality of lenses that filter and/or combine the illumination patches. In some embodiments, the optical device 108 is configured to combine the illumination patches and then project the combined illumination patches to a display device or display system. In some embodiments, the optical device 108 includes lenses and beamsplitters configured to size the received light and to direct light to a micro display device (e.g., micro LCD device, micro DLP device). In some embodiments, the optical device 108 is or includes components of a heads up display system or helmet mounted display system.

Figure 2:
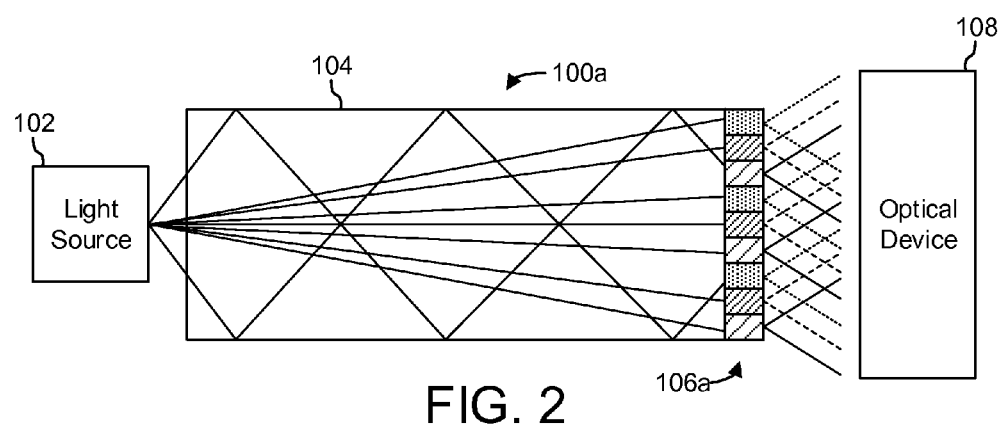
FIG. 2 is a schematic illustration of a multicolor illumination system having a single light source, according to an exemplary embodiment.

Referring now to FIG. 2, a schematic illustration of a multicolor illumination system 100a having a single light source is shown according to an exemplary embodiment. The multicolor illumination system 100a includes the light source 102, the light pipe 104, a color interface 106a, and the optical device 108. As shown in FIG. 2, the color interface 106a includes a plurality of distinct portions with each portion corresponding with one of three colors, though it will be appreciated that the color interface 106a may include additional or fewer portions and/or colors. Multiple portions of the color interface 106a may correspond to a particular color. For example, in some embodiments, the color interface 106a includes multiple portions corresponding to one of red, green, and blue arranged in a pattern (e.g., red-green-blue-red-green-blue, blue-red-blue-green-red-green, red-green-blue-blue-green-red, or other pattern). As shown in FIG. 2, the filters arranged so that the same filter type occurs every third filter. In another example, the color interface 106a may include the same red filter 116, green filter 126, and blue filter 136 of FIG. 1, but in a greater quantity and/or variously arranged in the color interface 106a. It will be appreciated that components of the color interface 106a may be arranged differently than those described above (e.g., additional filter types, non-alternate arrangement, including more filters of a first filter type and/or less filters of a second filter type). In some embodiments, the color interface 106a includes any number of color-associated portions and/or portion types (e.g., filters, quantum dots, and/or color phosphors), and the components may be organized or arranged according to any manner within the color interface 106a.

While different portions of the color interface 106, 106a are shown as roughly the same size in FIGS. 1-2, it will be appreciated that the size of the various portions of the color interface 106, 106a may vary according to exemplary embodiments of the inventive concepts disclosed herein. For example, in some embodiments, a red filter may be larger in size than a green filter or blue filter. The size or number of the filters, quantum dots, and/or color phosphors of the color interface 106, 106a may be varied in any way to favor a particular color, type of color and/or other display property.

Figure 3:
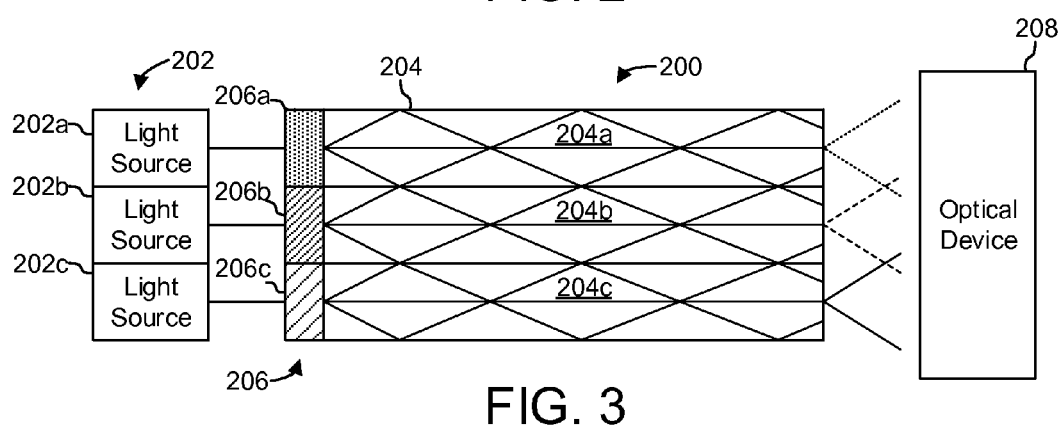
FIG. 3 is a schematic illustration of a multicolor illumination system having multiple light sources and multiple light pipes, according to an exemplary embodiment.

Referring now to FIG. 3, a schematic illustration of a multicolor illumination system 200 having multiple light sources 202 and multiple light pipes 204 is shown according to an exemplary embodiment of the inventive concepts disclosed herein. The multicolor illumination system 200 includes light sources 202, light pipes 204, a color interface 206, and an optical device 208. The light sources 202 may include multiple light sources, such as light source 202a, 202b, and 202c. The light sources 202a, 202b, 202c may be the same as one another or at least one of the light sources 202a, 202b, 202c being different from at least one of the other light sources 202a, 202b, 202c. For example, each of the light sources 202a, 202b, 202c may be an LED configured to emit a different color of light. For example, the light source 202a may be configured to emit a red light, the light source 202b may be configured to emit a green light, and the light source 202c may be configured to emit a blue light. The light pipe 204 may include multiple light pipes such as light pipe 204a, 204b, and 204c.

As shown in FIG. 3, the color interface 206 is located at an input end of the light pipe 204 (i.e., instead of at an output end of the light pipe 104 of the multicolor illumination systems 100 of FIG. 1 and the multicolor illumination system 200 of FIG. 2. As such, a desired color of light is created by the light source 202 and color interface 206 prior to the light entering the light pipe 204. In some embodiments, the color interface 206 functions as an input interface for inputting light rays into the light pipe 204. Characteristics of the color interface 206 may vary based on a characteristic of the light sources 202. For example, the light sources 202a, 202b, and 202c may be a red LED, a green LED, and a blue LED, respectively, and the color interface 206 may include three color phosphors 206a, 206b, 206c configured to receive light from one of the light sources. In some embodiments, each color phosphor is configured to emit a color similar to the light emitted by a corresponding light source. For example, in some embodiments, the light source 202a is a red LED and the color phosphor 206a is configured to receive red light from the red LED and to emit a red-colored light. In some embodiments, the color phosphors are excited by a light having a first color and emit light having a second color. In some embodiments, a color phosphor may be an efficient phosphor configured to absorb light having a first, higher frequency and emit light having a second, lower frequency. For example, the light source 202b may be a blue LED and the color phosphor 206b may be configured to absorb blue light from the blue LED and to emit a red-colored light. In another example, one or more of the light sources 202 are a white LED and the color interface 206 includes one or more color filters that receive light from the white LED, absorb a first color of light, and emit an illumination patch having a second color.

In some embodiments, the light pipe 204 includes a plurality of stacked light pipes. As shown in FIG. 3, the light pipe 204 includes three light pipes 204a, 204b, and 204c, each corresponding with a respective color phosphor (e.g., color phosphors 206a, 206b, and 206c) of the color interface 206. Each color phosphor 206a, 206b, and 206c is configured to receive light from a respective light source and emit light into a respective light pipe 204a, 204b, and 204c before the emitted light is received by the optical device 208. In some embodiments, each light pipe is separate from the others and does not permit light traveling therein to enter a neighboring light pipe. For example, the light pipe 204*b* may include a mirror array so that light rays within the light pipe 204*b* are confined to the light pipe 204*b* and do not interfere with, reflect into, or otherwise enter light pipes 204*a* or 204*c*. The optical device 208 is configured to receive light from each light pipe 204*a*, 204*b*, and 204*c*, combine the received light to form a combined light, and emits the combined light to a display device. In some embodiments, the optical device 208 is the same as the optical device 108.

Referring now to FIG. 4, a schematic illustration of a multicolor illumination system 300 having a single light source 302 and multiple light pipes 304, 308 is shown according to an exemplary embodiment of the inventive concepts disclosed herein. The components of the multicolor illumination system 300 may include components similar to or the same as those shown and described with respect to FIGS. 1-3. For example, the light source 302 may include a white LED, a color LED, a UV LED, and/or a laser. The light source 302 is structured to emit a light into a first light pipe 304 that outputs the light to a color interface 306. The color interface 306 receives the light from the first light pipe 304 and emits colored light into a second light pipe 308 that in turn emits the colored light into an optical device 310. The optical device 310 may be structured to receive light from the second light pipe 308 and combine the received light and cause the combined received light to be projected to a display device. The optical device 310 may be the same as the optical device 108 or the optical device 208.

The color interface 306 may include, for example, three color filters (e.g., a red filter, a green filter, and a blue filter), quantum dots, or color phosphors as shown and described with respect to any of the various embodiments herein. In some embodiments, the color interface 306 is the same as the color interface 106, 106*a*, or 206. In some embodiments, each color filter of the color interface 306 is associated with a corresponding light pipe within the second light pipe 308. For example, the light pipe 308 may include any number of stacked light pipes or be the same as or similar to the light pipe 204 of FIG. 3. In some embodiments, the multicolor illumination system 300 may include additional color interfaces located variously throughout the light pipes and/or additional light pipe configurations.

Referring now to FIG. 5, a schematic illustration of a color interface 500 having dead bands 502 is shown according to an exemplary embodiment of the inventive concepts disclosed herein. The dead bands 502 may be located in between each color filter 504*a*, 504*b*, 504*c* (or between each quantum dot or color phosphor). In some embodiments, the dead bands 502 may be configured to separate groups of color filters, quantum dots, and/or color phosphors. For example, multiple colors filters, quantum dots, and/or color phosphors may be grouped together based on color and separated from other color filters, quantum dots, and/or color phosphors by one or more of the dead bands 502. In some embodiments, the dead bands 502 are thick enough to provide gaps in the illumination patches emitted by the color interface 500, for example, to prevent color overlap and/or color blending. For example, in some embodiments, light emitted from near the edge of two color filters (e.g., 504*a* and 504*b*) may result in illumination patches that include overlap with one another, thereby creating an overlap area of a different color. In some embodiments, at least one of the dead bands 502 is structured to absorb all colors of light. In some embodiments, at least one of the dead bands 502 is structured to reflect light back into a light pipe or to deflect light to one of the color filters 504*a*, 504*b*, 504*c*. In some embodiments, at least one of the dead bands 502 may not completely prevent all light from being emitted from the dead band 502 to an optical device.

Referring now to FIG. 6, a flow diagram of a method 600 for controlling a color output of the multicolor illumination system 100 is shown according to an exemplary embodiment of the inventive concepts disclosed herein. While the method 600 is described with respect to the multicolor illumination system 100 of FIG. 1, the method 600 may be implemented using any of the embodiments contemplated herein. For example, the color of the emitted illumination patches may be altered by a user controlling the multicolor illumination system 100 to turn off, disable, or otherwise manipulate one or more of the color filters, quantum dots, color phosphors, dead bands, and/or light sources. In some embodiments, a user may be able to control individual color filters, quantum dots, and/or color phosphors manually, or the individual color filters, quantum dots, and/or color phosphors may be disabled automatically by a control system and/or other electronic components based on various characteristics of the multicolor illumination system 100, display environment, time of day, and/or user inputs.

The method 600 includes determining a current condition of the environment surrounding the display system (602). For example, based on detecting a nighttime condition, or a user initiating a night mode, and the multicolor illumination system 100 may emit illumination patches configured for night viewing into the optical device 106. For example, the color white may be reduced or eliminated at night or in dark conditions because a color other than white may be easier for a viewer to see in dark conditions. The method 600 further includes receiving a user input relating to an operation of the multicolor illumination system 100 (604). For example, a user input may specify that an image be displayed in a particular color (e.g., red or orange). The method 600 further includes altering a component of the multicolor illumination system 100 based on the current condition and the user input (606). For example, a component of the multicolor illumination system 100 may be deactivated (e.g., the red filter 106*a*) so that the illumination patches emitted into the optical device 108 consist of a different color (e.g., a color having less red) than if the component is not deactivated. In another example, the light source 102 may be controlled so that the intensity of the light emitted from the light source is more intense, thereby resulting in brighter illumination patches, or less intense so that the illumination patches are less bright. In some embodiments, the light source 102 may be controlled to reduce power consumption. For example, in some embodiments, individual colors may be turned off (e.g., turning off the red and blue filters, resulting in a green display) so that the multicolor illumination system 100 uses less power. In another example, the multicolor illumination system 100 for a HUD for an aircraft may be configured to create display images of a color other than blue as blue imagery may not be seen clearly by a user when displayed against a blue sky. Therefore, in such a configuration, the blue filter may be turned off so that the projected imagery is more clearly visible to the pilot of an aircraft.

The inventive concepts disclosed herein are described above with reference to drawings. These drawings illustrate certain details of specific embodiments that implement the systems and methods and programs of the inventive concepts disclosed herein. However, describing the inventive concepts disclosed herein with drawings should not be construed as imposing on the inventive concepts any limitations that may be present in the drawings. The inventive concepts disclosed herein contemplate methods, systems and program products on machine-readable media capable of accomplishing its operations. No claim element herein is to be construed under the provisions of 35 U.S.C. § 112, sixth paragraph, unless the element is expressly recited using the phrase "means for." Further, no element, component or method step of the inventive concepts disclosed herein are intended to be dedicated to the public, regardless of whether the element, component or method step is explicitly recited in the claims.

It should be noted that although the flowcharts and diagrams provided herein may show a specific order of method steps, it is understood that the order of these steps may differ from what is depicted. Also two or more steps may be performed concurrently or with partial concurrence. Such variation may depend on the software and hardware systems chosen and on designer choice. It is understood that all such variations are within the scope of the inventive concepts disclosed herein. Likewise, software and web implementations of the inventive concepts disclosed herein may be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the inventive concepts disclosed herein have been presented for purposes of illustration and description. It is not intended to be exhaustive or to limit the inventive concepts disclosed herein to the precise form disclosed, and modifications and variations are possible in light of the above teachings or may be acquired from practice of the inventive concepts disclosed herein. The embodiments were chosen and described in order to explain the principles of the inventive concepts disclosed herein and their practical application to enable one skilled in the art to utilize the inventive concepts disclosed herein in various embodiments and with various modifications as are suited to the particular use contemplated.

What is claimed is:

1. A display system for providing multicolor light patches for illuminating display images, comprising:
    at least one light source configured to provide a light;
    at least one light pipe having an input end and an output end and being configured to allow the light to enter via the input end and exit via the output end;
    at least one color interface coupled to the output end of the at least one light pipe, the at least one color interface including at least one color material, wherein each color material has a different color characteristic, and wherein light passing through the color material creates an illumination patch associated with the color characteristic of the color material; and
    an optical device coupled with the at least one color interface and configured to receive the illumination patches, combine the illumination patches, and cause a combined illumination patch to be projected as a display image.

2. The display system of claim 1, wherein the at least one light source is configured to provide a white light; and
    wherein the at least one color material comprises a plurality of color filters.

3. The display system of claim 2, wherein the plurality of color filters comprise a red filter, a green filter, and a blue filter.

4. The display system of claim 1, wherein the at least one light source is configured to provide ultraviolet (UV) light;
    wherein the at least one color material comprises a plurality of quantum dots; and
    wherein each quantum dot is configured to absorb the ultraviolet light from the at least one light source and to emit a particular color of light based on the wavelength of the absorbed light.

5. The display system of claim 1, wherein the at least one light source is configured to provide a monochromatic light;
    wherein the color material comprises a plurality of quantum dots; and
    wherein each quantum dot is configured to absorb the light from the at least one light source and to emit a color of light based on the wavelength of the absorbed light.

6. The display system of claim 1, wherein the at least one light source is configured to provide an amplified light;
    wherein the color material comprises a plurality of color phosphors; and
    wherein each color phosphor is configured to absorb the amplified light and to emit a color of light different from the absorbed light.

7. The display system of claim 1, wherein the at least one color interface further comprises one or more dead bands separating the at least one color material into areas such that different colors of light are produced in each area.

8. The display system of claim 1, wherein the optical device include a plurality of lenses and beamsplitters configured to direct the combined illumination patch to a micro display device.

9. A display system for providing multicolor light patches for illuminating display images, comprising:
    a plurality of light sources configured to provide a light;
    a plurality of light pipes having an input end and an output end, each light pipe corresponding to one of the light sources and configured to receive light from the corresponding light source;
    at least one color interface coupled to the input end of each light pipe, the at least one color interface including a plurality of color materials each having a different color characteristic and corresponding to one of the light pipes, and wherein light passing through the color materials and corresponding light pipe creates a plurality of illumination patches, each illumination patch associated with one of the color characteristics of the color materials; and
    an optical device coupled with at least one light pipe of the plurality of light pipes and configured to receive the illumination patches, combine the illumination patches, and cause a combined illumination patch to be projected as a display image.

10. The display system of claim 9, wherein the light sources are configured to provide an amplified light; and
    wherein the color materials comprise a plurality of color phosphors.

11. The display system of claim 10, wherein the amplified light is at least one of red, blue, and green.

12. The display system of claim 9, where the light sources are configured to provide ultraviolet (UV) light;
    wherein the color materials comprise a plurality of quantum dots; and
    wherein each quantum dot is configured to absorb the ultraviolet light from the light source and to emit a particular color of light based on the wavelength of the absorbed light.

13. The display system of claim 9, wherein the light sources are configured to provide a monochromatic light;

wherein the color materials comprise a plurality of quantum dots; and wherein each quantum dot is configured to absorb the light from the light source and to emit a color of light based on the wavelength of the absorbed light.

14. The display system of claim 9, wherein at least one light source of the plurality of light sources is configured to provide a white light; and wherein the color materials comprise a plurality of color filters.

15. The display system of claim 14, wherein the color filters include a red filter, a green filter, and a blue filter.

16. The display system of claim 9, wherein the optical device include a plurality of lenses and beamsplitters configured to direct the combined illumination patch to a micro display device.

17. A display system for providing multicolor light patches for illuminating display images, comprising:

a light source configured to provide a light;

a first light pipe and a second light pipe, each light pipe having an input end and an output end and being configured to allow the light to enter via the input end and exit via the output end;

at least one color interface coupled to the output end of the first light pipe and the input end of the second light pipe, the at least one color interface including a plurality of color materials each having a different color characteristic, wherein light passing through the first light pipe, the color materials, and the second light pipe creates a plurality of illumination patches, each illumination patch associated with one of the color characteristics associated with the color materials; and an optical device coupled with at least one of the first light pipe and the second light pipe and configured to receive the illumination patches, combine the illumination patches, and cause a combined illumination patch to be projected as a display image.

18. The display system of claim 17, wherein the first light pipe comprises a single light pipe, and wherein the second light pipe comprises a plurality of sub-light pipes.

19. The display system of claim 18, wherein the light source comprises at least one of a light source configured to provide white light, a white light emitting diode (LED), an ultraviolet LED, a laser, and a color LED.

20. The display system of claim 19, wherein the color materials comprise a plurality of at least one of a color filter, a quantum dot, and a color phosphor.

* * * * *